United States Patent [19]

Barton

[11] 4,119,969
[45] Oct. 10, 1978

[54] SCANNING BEAM NAVIGATIONAL BEACON WITH TRANSMITTED COHERENCE REFERENCE SIGNAL AND THINNED TWO-DIMENSIONAL PHASED ARRAY

[75] Inventor: Paul Barton, Bishop Stortford, England

[73] Assignee: International Standard Electric Corporation, New York, N.Y.

[21] Appl. No.: 803,444

[22] Filed: Jun. 6, 1977

[30] Foreign Application Priority Data

Jun. 10, 1976 [GB] United Kingdom ............... 23994/76

[51] Int. Cl.$^2$ .......................... G01S 1/16; G01S 1/18
[52] U.S. Cl. ....................... 343/108 M; 343/100 SA
[58] Field of Search ......... 343/100 SA, 108 M, 105 R

[56] References Cited

U.S. PATENT DOCUMENTS 4,035,804  7/1977  Overbury .................. 343/108 M

Primary Examiner—Theodore M. Blum
Attorney, Agent, or Firm—William T. O'Neil

[57] ABSTRACT

A scanning beam navigational beacon for transmission to a remote station (aircraft, for example) which measures a navigational angle therefrom. A thinned, two-dimensional main antenna array and linear reference array are provided. A single antenna element is provided at each vertical level of the array. Reference radiations are based on main array phase to allow coherent signal processing at the remote station. Azimuth frequency diversity is provided by grouping of the excited main elements and reference array elements at different frequencies, all features cooperating to minimize the effects of azimuthally displaced multipath signals which may fall inside the far-beam of elevation guidance. Thus, the effective array aperture exhibits a distributed frequency pattern in the azimuth plane.

9 Claims, 15 Drawing Figures

SCANNING BEAM NAVIGATIONAL BEACON WITH TRANSMITTED COHERENCE REFERENCE SIGNAL AND THINNED TWO-DIMENSIONAL PHASED ARRAY

BACKGROUND OF THE INVENTION

1. Field of the Invention

This invention relates to scanning-beam navigational radio beacon systems.

2. Description of the Prior Art

In a conventional time-reference scanning beam microwave landing system, there is transmitted a single frequency collimated beam which sweeps the service sector of the system, and evaluation of the time of reception of the beam with respect to a separate reference pulse gives angular information. The detected signal in a receiver of the system is related directly to the received power from the scanning beam antenna and, as such, is noncoherent in nature. This does not allow the use of coherent signal processing methods which may be required to achieve necessary accuracy in difficult situations.

The particular type of time-reference, scanning-beam system to which the present invention is applicable is variously described in the technical literature. One useful background reference is a technical paper entitled, *Time-Reference Microwave Landing System Multipath Control Techniques*, by R. J. Kelley, published in the JOURNAL OF THE INSTITUTE OF NAVIGATION, Washington, D.C. (Volume 23, No. 1, Spring 1976). That reference is particularly useful in understanding the multi-path problem, with which the present invention deals uniquely.

It has been proposed, as described in copending U.S. patent application Ser. No. 662,342, filed Mar. 1, 1976, now U.S. Pat. No. 4,053,892, to supplement transmission of the swept beam by adding a separate, continuous whole of the service sector of a coherence reference signal having a frequency offset from the scanning beam frequency. That expedient provides a phase (coherence) reference which is utilized at a remote receiver of the system to provide a detected signal which is coherent, which, in an elevation system, permits an accurate determination of low angle information. This particular accuracy increase is due to the ability of such a system to discriminate against noncoherent interference, such as reflected multipath signals.

SUMMARY

The general object of the present invention is to equip a scanning beam system, of the general character hereinbefore referenced, with the ability to use an economical array configuration for elevation while providing significant discrimination against obstacles, generating multipath signals in azimuth, in the fan-beam of guidance. This ability is also based on the use of a phase reference arrangement providing for coherent signal processing at an airborne (remote) receiving station. Without that, the provision of azimuth diversity in a scanning beam system is extremely complicated, requiring a number of completely filled elevation arrays staggered horizontally, with ensuing high cost.

According to the invention, there is provided a scanning beam navigational beacon system including an antenna comprising $n$ first elements arranged within an overall coordinate array configuration having $m \times n$ possible element locations, where $M \geq 2$. The direction of the $n$ axis of the array is the beam scanning direction, such that there is only one of said first elements on each of the $n$ coordinates and the elements are randomnly distributed in m groups among all the $m$ coordinates. The antenna also includes at least $m$ further elements as a linear reference array, each of its elements being associated with a different one of the m groups of said first elements. Means are included for supplying an arithmetic progression (series) of $m$ different radio frequencies, and also means for energizing each of the $m$ further elements with one of said $m$ different frequencies are supplied. The same frequency offset is imparted separately to each of said $m$ different frequencies to produce m frequencies as main (first element group) excitations, and a newrork of $n$ phase shifters in series with the path to each of said $n$ first elements provides for the beam to be scanned in the required direction. The said network comprising the same m groups as the m groups of the first elements with each group having as its common input the one of said offset frequencies derived from the respective one of said $m$ different frequencies energizing the associated one of said further elements.

Each of the m reference array signals are thus generated in a phase coherent relationship vis-a-vis the corresponding main array column.

The invention will be better understood from the following description in conjunction with the accompanying drawings.

DESCRIPTION OF THE PREFERRED EMBODIMENT.

Figure 1:
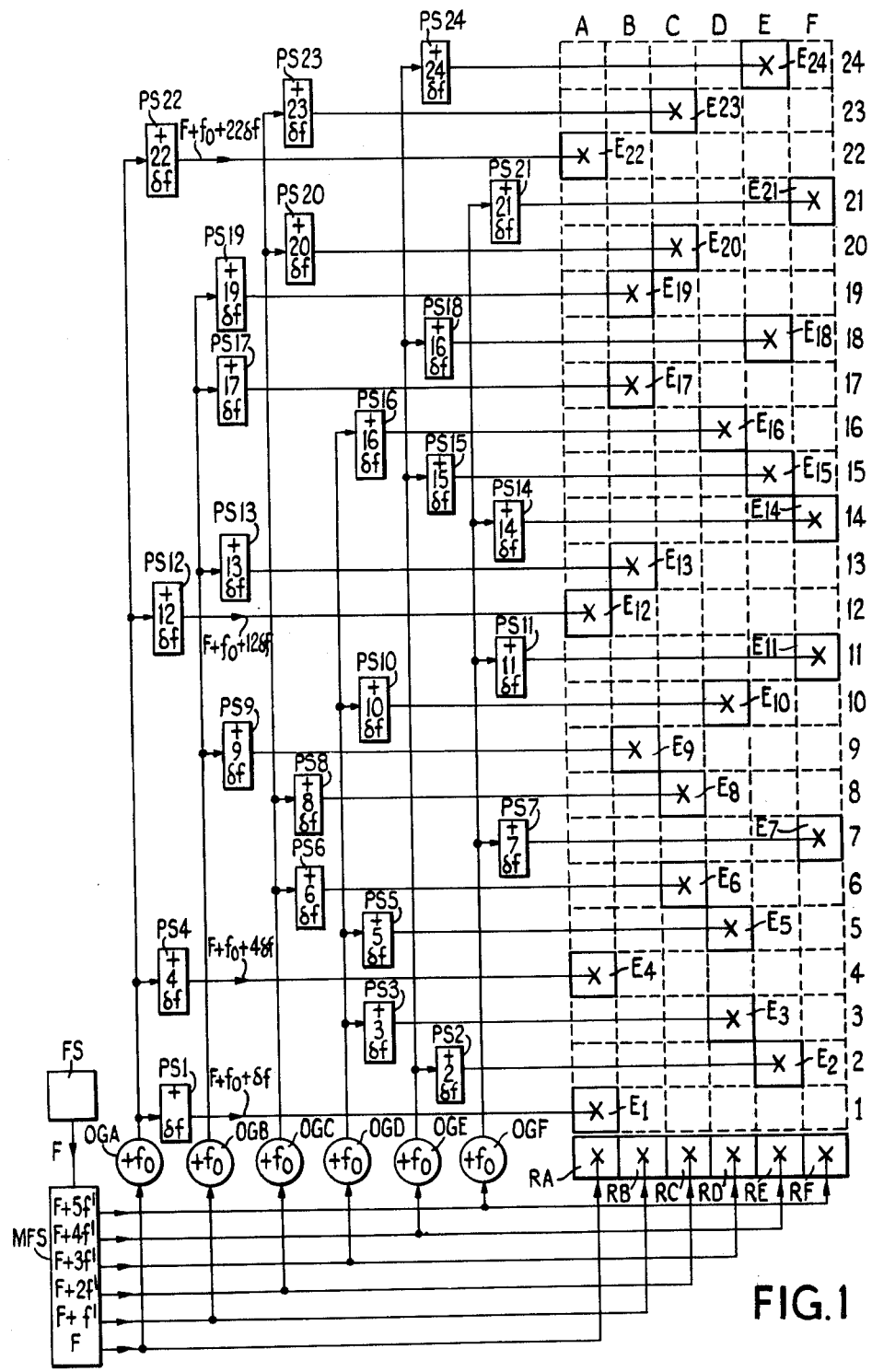
FIG. 1 shows an antenna array and drive circuits for an elevation scanning beam system with azimuth diversity according to the invention.

The scanning beam arrangement to be described involves the provision of separable signals in the receiver which relate to the transmitted contributions of specific element pairs. The elevation array at the beacon site as shown in FIG. 1 has a partially filled two-coordinate array configuration totaling 24 elements ($E_1$ through $E_{24}$) of the 144 possible locations (24 × 6, vertical and horizontal, respectively) for "main" array radiator elements, and also has a horizontal line of further radiator elements RA-RF which are reference elements. The arrangement of elements $E_1$-$E_{24}$ for the "main" (scanning beam) signal is intentionally irregular, for example, as illustrated in FIG. 1. There is one element E per incremental, vertical position for the main array but their position in azimuth are randomized. Each main array element E is fed by an individual phase shifter (PS1 through PS24), and groups of phase shifters are fed by individual offset generators OGA through OGF.

For the clearest explanation of the arrangement, the action of phase-shifters in a scanning beam array is considered to be equivalent to the production of slight frequency offsets. The regular shortening or lengthening of the electrical path length as provided by ideal phase-shifters can properly be thought of in this light.

Figure 2:
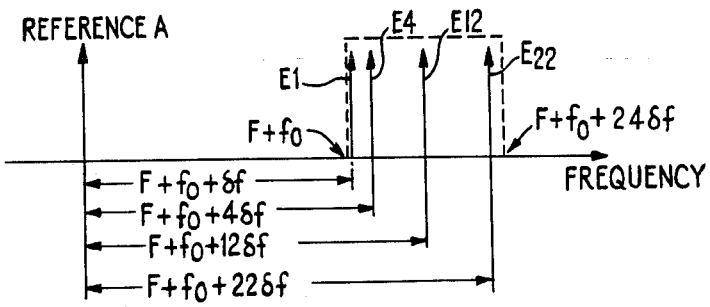
FIG. 2 graphically illustrates frequencies used in one vertical group of elements of the device of FIG. 1.

The specific transmission arrangement to be described involves grouping together those main elements of the array which are vertically in-line with a particular reference element. Consider the first such group (group A), comprising those elements in the vertical line on the extreme left of the array. The frequency applied to the associated reference element RA is F Hz. This signal is offset $f_o$ Hz by the offset generator OGA for application to the phase-shifters PS1, PS4, PS12 and PS22 physically behind each of the array elements E1, E4, E12 and E22 in the group. As described above, the phase-shifters are assumed to cause additional frequency offsets, this being illustrated in FIG. 2. The amount of angular offset caused by a given phase-shifter will be proportional to the vertical position of the associated element compared with the reference position. For instance, in FIG. 1, the phase-shifter PS12 driving the element E12, which is in the 12th vertical position in the main array, contributes an effective offset of $12\delta f$, where $\delta f$ is the incremental offset over a unit vertical spacing.

In order that the signals in the group B (second vertical line from left) do not interfere with those from group A, the reference frequency for group B is offset in Multiple Frequency Source MFS from that of the first group by f' Hz, resulting in a frequency of (F + f') Hz for group B. From this point on, the transmission from the elements in group B is very similar to the arrangement described for column A, the frequency being further offset by offset generator OGB to (F + f' + $f_o$) Hz and applied to the phase-shifters PS9, PS13, PS17 and PS19 connected to the elements in this group (E9, E13, E17 and E19, respectively).

The third and subsequent groups C. D. E and F are excited in similar fashion, but with successively larger initial offsets in an arithmetic progression series from the carrier frequency of the first group. Thus, the carrier frequencies for groups A, B, C, D, E and F are F, F+f', F+2f', F+3f', F+4f', and F+5f', respectively, and are derived from multiple frequency source MFS fed in turn by a source FS of frequency F. There is no need for tight phase coherence between these multiple output frequencies. With regard to the offset generators OGA - OGF, the output of each should be phase-coherent with its input, however.

Figure 3:
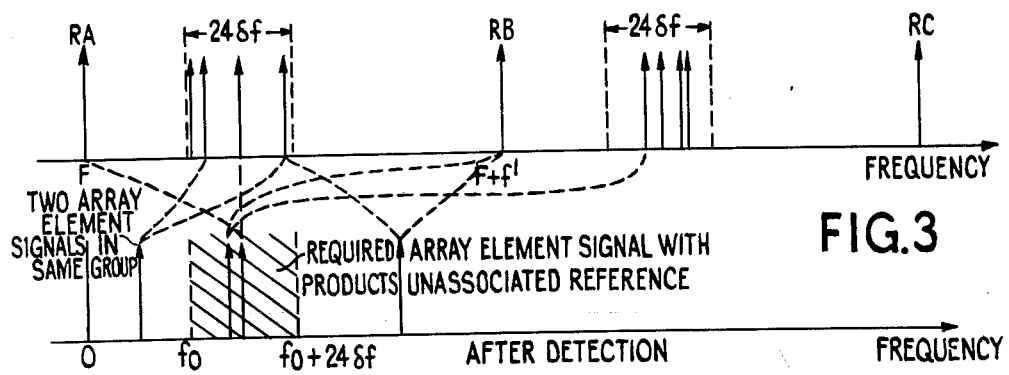
FIG. 3 shows examples of cross-products formed in the detection process.

It is important that the frequencies chose for the various offsets result in a received and detected signal in which the required products are available without contamination. The received signal is applied to a detector which for the sake of clarity is considered to be a square-law type. The detected baseband signal will be composed of signals corresponding to frequency differences between all possible permutations of input frequencies taken two at a time, and without proper arrangement can produce a detected base band signal which irreversibly mixes desired and undesired components (see FIG. 3).

The signal required at the output of the detector (to be further described subsequently) is composed of the beat frequencies between the signal contributions from each element of the main array and its associated reference. The essential characteristic of a scanning beam spectrum with an associated reference frequency shows direct association of a point within the spectrum with a point along the aperture of the array. Thus, a scanning beam elevation system quite generally requires that the ultimate arrangement of the signal spectrum (which in this case occurs after detection in the receiver) must include a clear region where the wanted beat frequencies each associated with the separate array elements are staggered in the order that corresponds to the vertical position in the array of each particular element.

Figure 4:
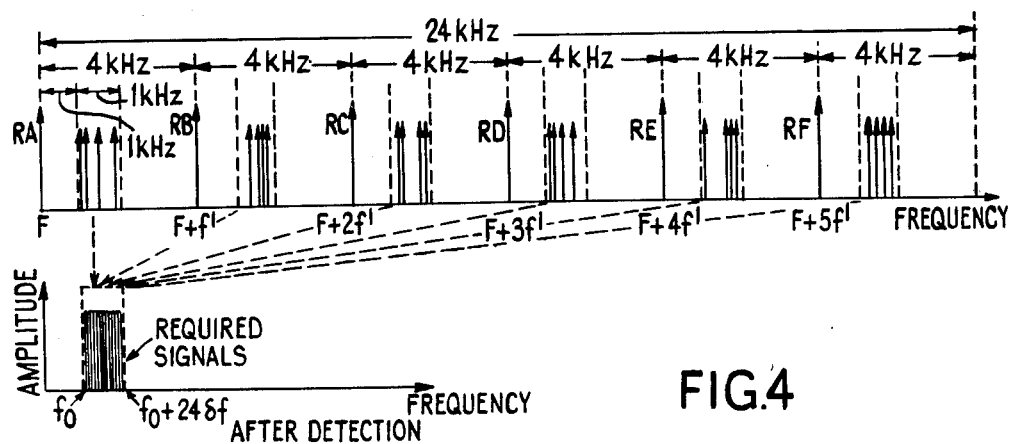
FIG. 4 shows the overall frequency format of the device of FIG. 1.

The undesired products fall into two categories. The first is made up of those signals which represent the beat between any two array elements (not a reference element) in the same vertical line. By choosing $f_o$ to be equal to or greater than the total range of the wanted spectrum, the products in question fall below the band of desired components (FIG. 4). The second category is composed of beat signals between a signal in one group and signals in another group. Again, the figure shows how contamination can be avoided, in this case by choosing the incremental offset between successive carriers (f') to be equal or greater than four times the offset frequency ($f_o$) applied in common to the array elements.

The width of the significant spectrum in a conventional scanning beam system is of the order of the reciprocal of the "dwell" time (T) of the beam passing the receiver (often defined between the −3 dB points). For the present system, the width of the uncontaminated spectral region required for "composing the beam" after detection is also given by the above definition.

Take, for example, the case of a 1 ms dwell time. The essential spectrum is contained in a 1 kHz, band, and this sets a lower limit on the choice of $f_o$ of the same amount. In turn, this defines a lower limit on the incremental carrier offset (f') of 4 kHz. With 6 vertical groupings of elements, then, the total bandwidth required for the signal transmission is approximately 24 kHz. FIG. 4 shows this frequency arrangement.

Figure 5:
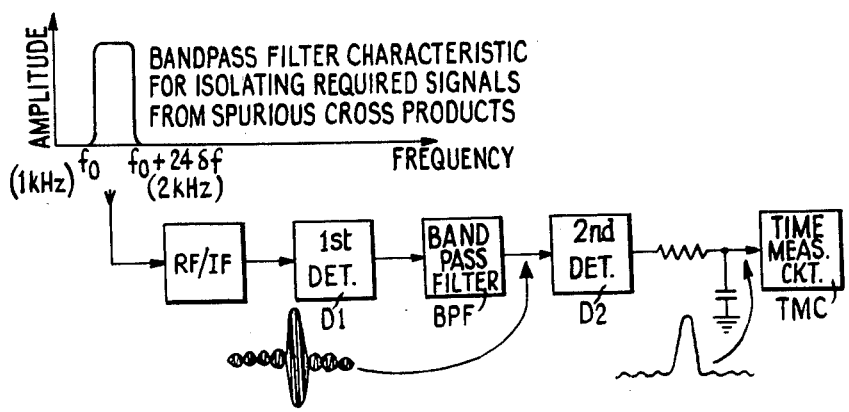
FIG. 5 shows the basic remote (airborne) receiver configuration.
Figure 6:
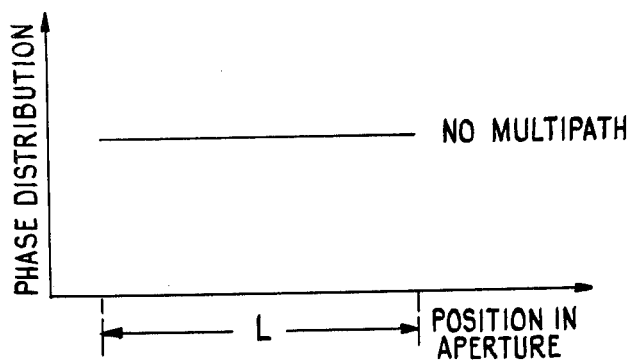
FIG. 6 depicts array phase distribution by position in the no multipath situation.
Figure 7:
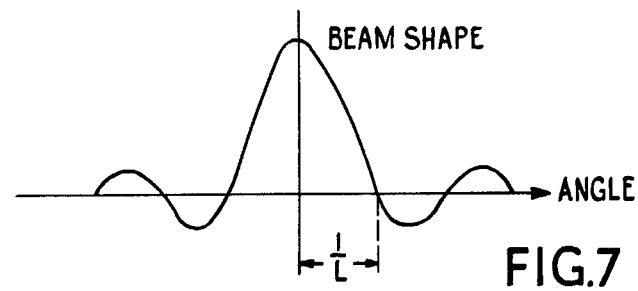
FIG. 7 depicts beam shape versus angle in the no multipath situation.

FIG. 5 shows the basic receiver with Rf and IF amplification (and mixing) labeled RF/IF, followed by a first detector D1, and band-pass filter BPF for filtering the detected signal, so that the undesired products can be eliminated, as established in FIG. 4. Band pass filter BPF has a lower edge of $f_o$ and the upper edge at about $f_o$ + 1/T where T is the dwell time of the scanning beam. Its filtered signal output contains the beam-shape in time as an envelope of a subcarrier, thus it must be applied to a second detector D2 and then to a time measurement circuit TMC. The second detector could advantageously comprise a "zero" IF stage giving in-phase and quadrature outputs. By applying the two latter signals to true squaring circuits, the combined output would be an exact representation of the required beam shape.

The example of array configuration shown in FIG. 1 may have additional laterally displaced reference positions to allow element groupings to be associated with different reference elements in successive scans and provide further averaging of the beam distortion without requiring aircraft motion.

Figure 15:
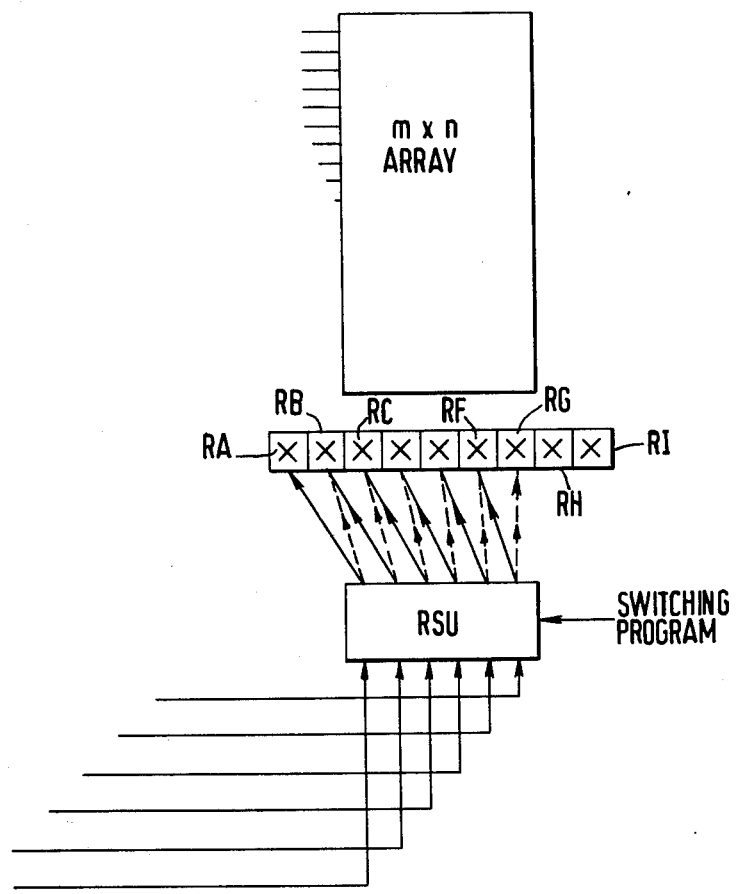
FIG. 15 depicts additional equipment for introducing further averaging of beam distortion in the arrangement of FIG. 1.

The additional equipment required for this is shown in FIG. 15. The feeds to the reference elements RA etc are led via a switching unit RSU which operates under the control of a switching program. During the first scan cycle, for example, the feeds are switched through to the group of reference elements RA-RF. During the next scan cycle the feeds are switched through to the group of reference elements RB-RG and so on until the feeds are switched to the last group RD-RI. The switching programm can then be repeated or reversed. Alternatively, the groups can be switched in a random or pseudo-random sequence.

Figure 8:
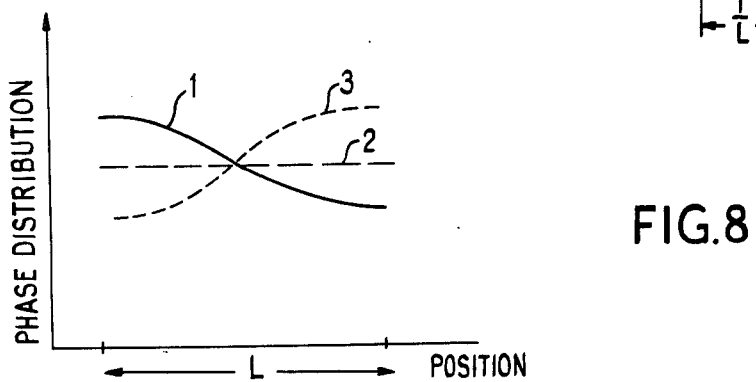
FIG. 8 depicts phase distribution versus position in aperture for various conditions.

FIG. 8 shows phase distribution versus position in aperture with (curve 1) in-beam in-phase multipath, (curve 2) no multipath, and (curve 3) in-beam out-of-phase multipath.

Figure 9:
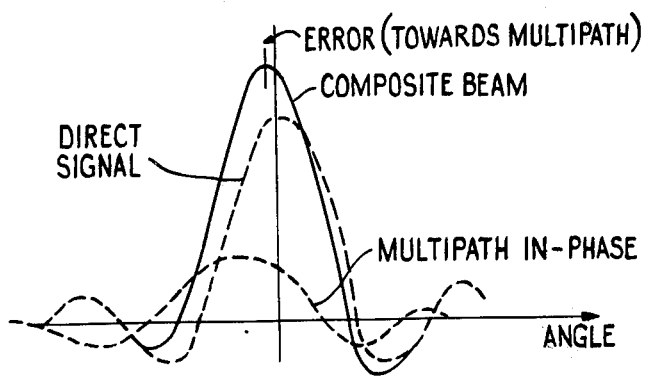
FIG. 9 shows beam shape versus angle in a multipath situation.

FIG. 9 shows beam shape versus angle with resulting error (towards multipath) of the composite beam (direct signal + in-phase multipath).

Figure 10:
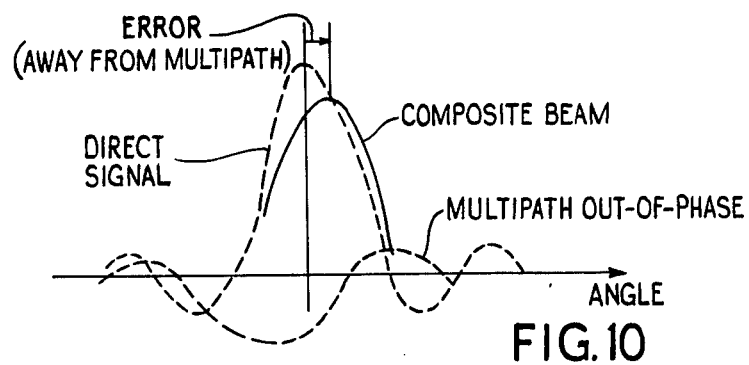
FIG. 10 presents beam shape versus angle with resulting error in a multipath situation.

FIG. 10 will be seen to show beam shape versus angle with resulting error (away from multipath) of the composite beam (direct signal + out-of-phase multiphase).

Figure 11:
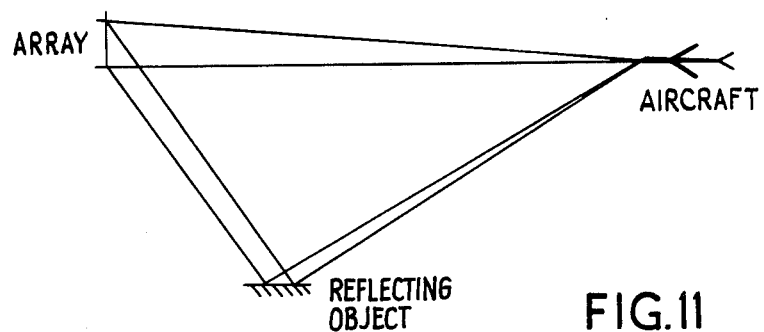
FIG. 11 depicts the geometry of direct and multipath signals.

The phase of multipath offset azimuthally but in-beam in elevation varies with horizontal position within the array, and FIG. 11 shows a plan view of direct signal paths between array and aircraft, and multipath transmission between array and aircraft, via a reflecting object.

Figure 12:
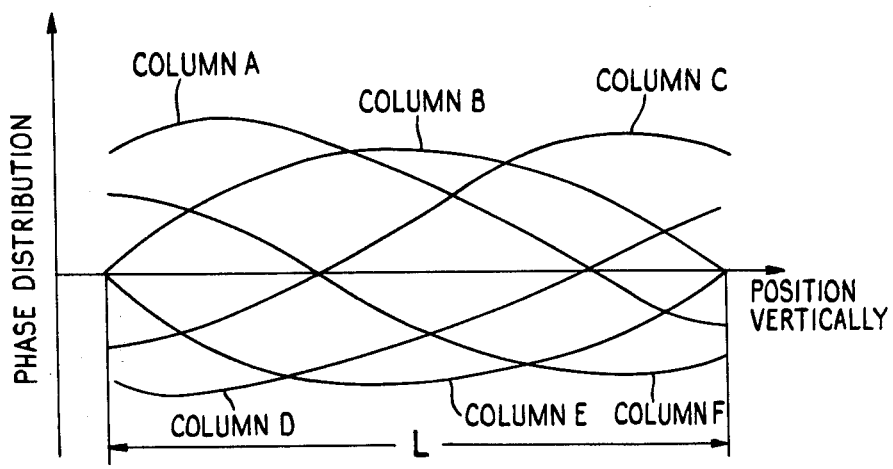
FIG. 12 is a phase distribution diagram by vertical element columns.

In this situation, some of the vertical groups A to F of the array "see" positive errors, some negative errors, as shown in FIG. 12.

Figure 13:
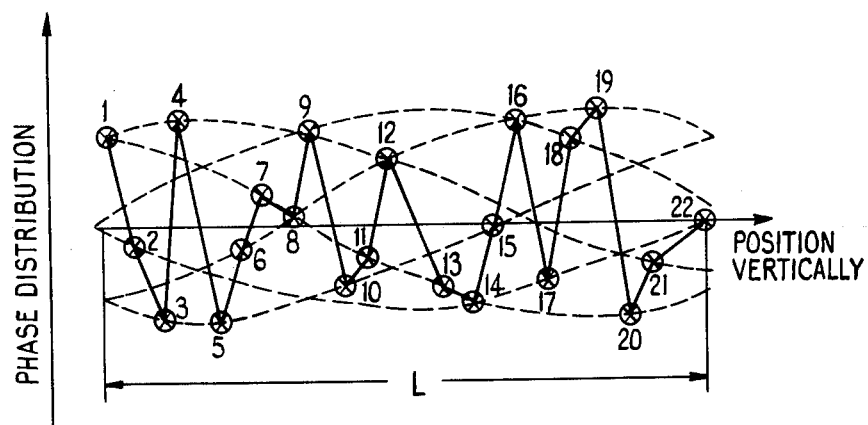
FIG. 13 depicts the decorrelated phase distribution over the array aperture.

With the array elements distributed throughout these columns, the phase error distribution is de-correlated, as shown in FIG. 13 wherein the relative positions of the 22 elements are identified by corresponding numbers.

Figure 14:
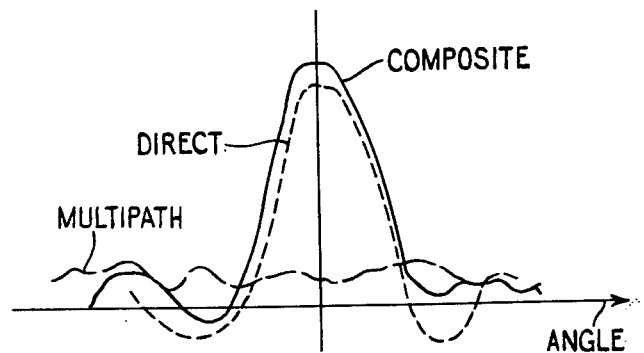
FIG. 14 depicts beam shape influences in a multipath situation.

This produces a beam shape, FIG. 14, which contains the coherent desired component and a residual randomized low level spectrum from the multipath.

It is to be understood that the foregoing description of a specific embodiment of this invention is made by way of example only and is not to be considered as a limitation on the scope of the inventive concepts.

What is claimed is:

1. A scanning-beam navigational radio beacon comprising:
    a main antenna array including $n$ first antenna elements randomly placed within a two-coordinate array configuration having $m \times n$ possible element locations, where $m \geq 2$ and $n > m$, said $n$ coordinate being the direction of scan, said first elements being placed one to a level in the $n$ direction of said array and $n/m$ elements being placed within each of said m columns of said first elements extending in said $n$ coordinate;
    a reference array including at least $m$ second antenna elements each geometrically associated with one of said $m$ columns of said first elements;
    first means for generating an arithmetic progression of $m$ first radio frequencies connected one to each of said $m$ second antenna elements;
    second means responsive to said first radio frequencies for generating $m$ second frequencies each equal to one of said first frequencies plus a uniform offset;
    and third means comprising $n$ scan control phase shifters each of which is connected discretely to a corresponding one of said $n$ first elements, the ones of said phase shifters corresponding to said first elements within each of said $m$ columns of first elements being excited by a corresponding one of said second means frequency outputs.

2. Apparatus according to claim 1 in which said reference array elements are each aligned in the column of said first elements to which they correspond, and in which said second means output frequency for each of said columns of first elements corresponds to the first means output for said aligned reference array element.

3. Apparatus according to claim 2 in which the common difference of said arithmetic progression of frequencies generated by said first means is equal to or greater than the reciprocal of the beam dwell time of the beam generated and scanned in said coordinate direction.

4. Apparatus according to claim 2 in which the common difference of said arithmetic progression of frequencies generated by said first means is at least equal to four times said offset frequency applied in said second means.

5. Apparatus according to claim 4 in which the common difference of said arithmetic progression of frequencies generated by said first means is equal to or greater than the reciprocal of the beam dwell time of the beam generated and scanned in said coordinate direction.

6. Apparatus according to claim 1 in which the common difference of said arithmetic progression of frequencies generated by said first means is at least equal to four times said offset frequency applied in said second means.

7. Apparatus according to claim 6 in which the common difference of said arithmetic progression of frequencies generated by said first means is equal to or greater than the reciprocal of the beam dwell time of the beam generated and scanned in said coordinate direction.

8. Apparatus according to claim 1 in which the common difference of said arithmetic progression of frequencies generated by said first means is equal to or greater than the reciprocal of the beam dwell time of the beam generated and scanned in said coordinate direction.

9. Apparatus according to claim 1 in which the number of said second antenna elements exceeds m and in which switching means are included for associating each of said m columns of first elements with a different group of said m second antenna elements on successive scan cycles.

* * * * *